March 10, 1936.  P. S. TICE  2,033,211
FUEL SUPPLY SYSTEM
Filed March 23, 1932   5 Sheets-Sheet 2
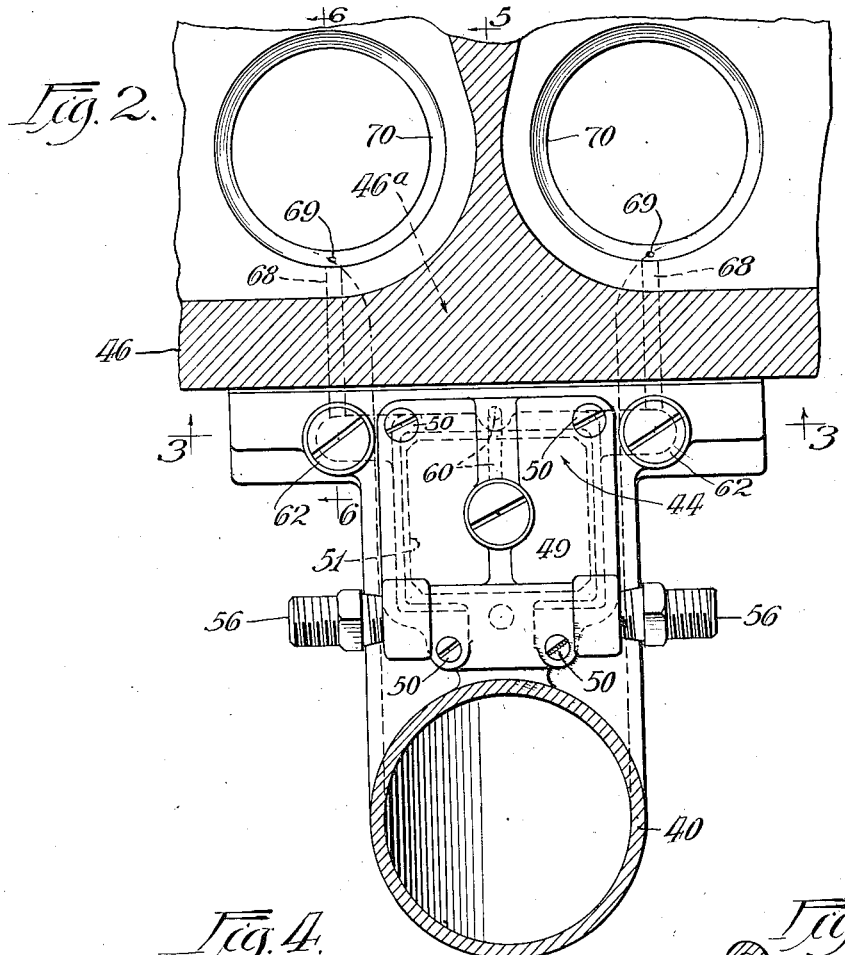
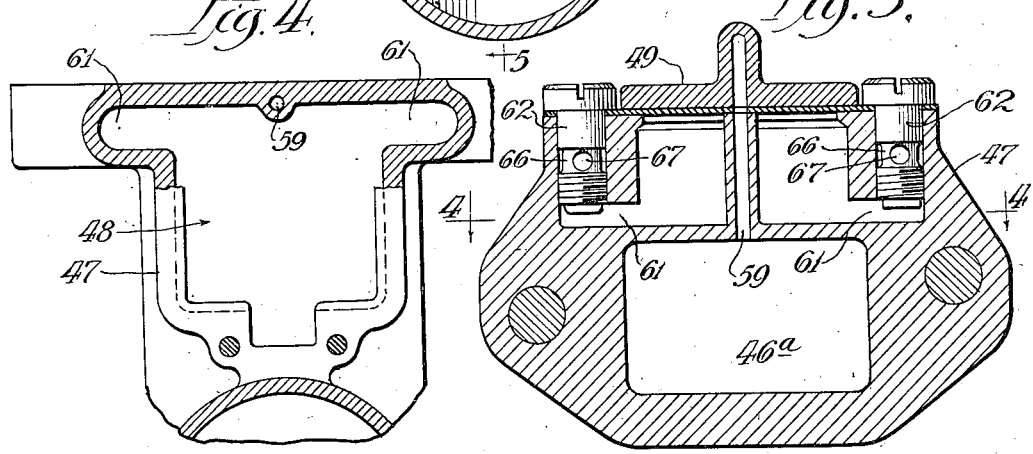
Inventor:
Percival S. Tice
By Rector, Hibben, Davis & Macauley
Attorneys.

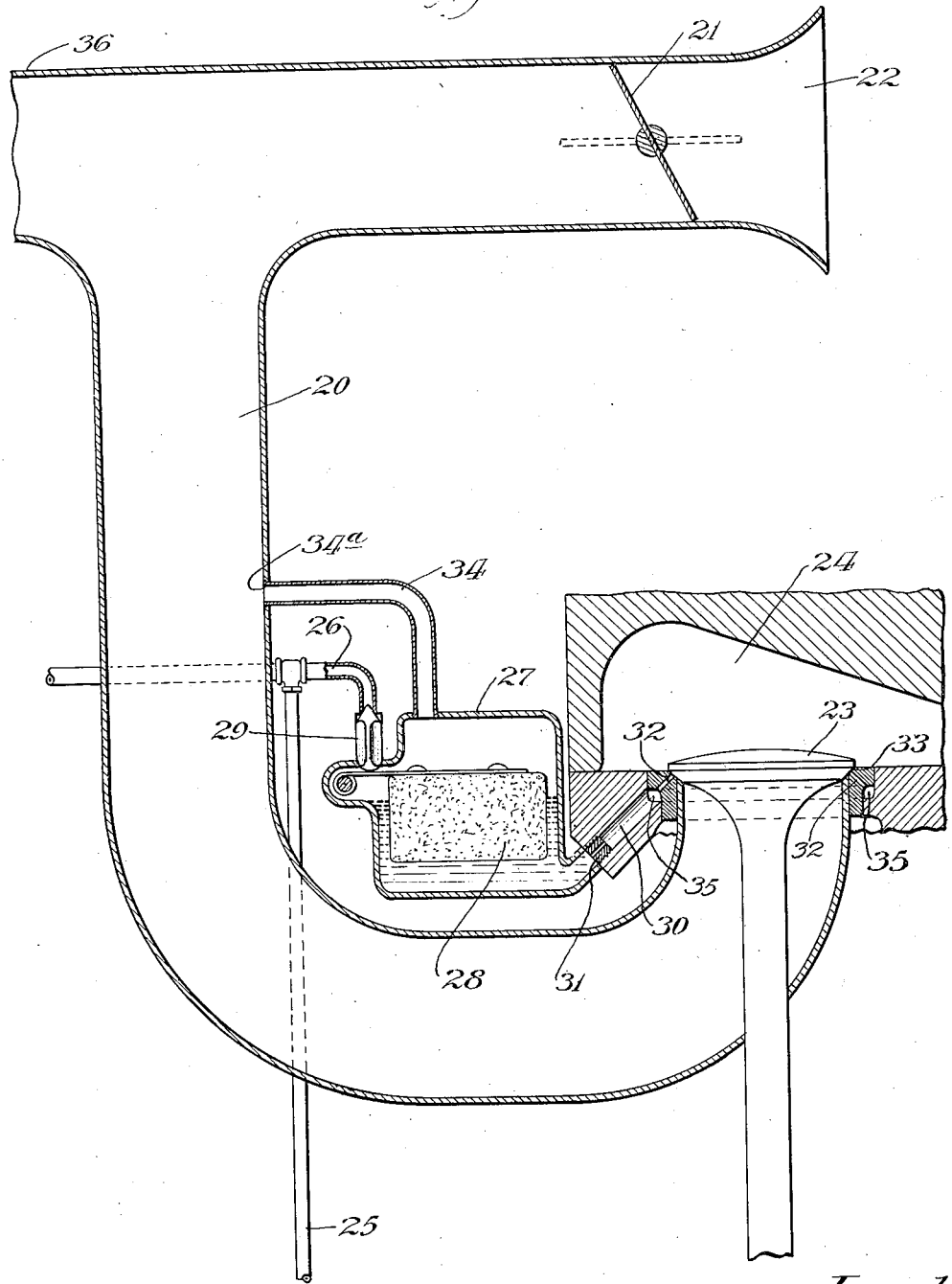

March 10, 1936.  P. S. TICE  2,033,211
FUEL SUPPLY SYSTEM
Filed March 23, 1932   5 Sheets-Sheet 3
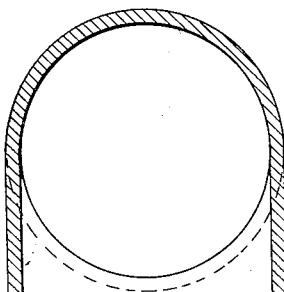
Fig. 5.
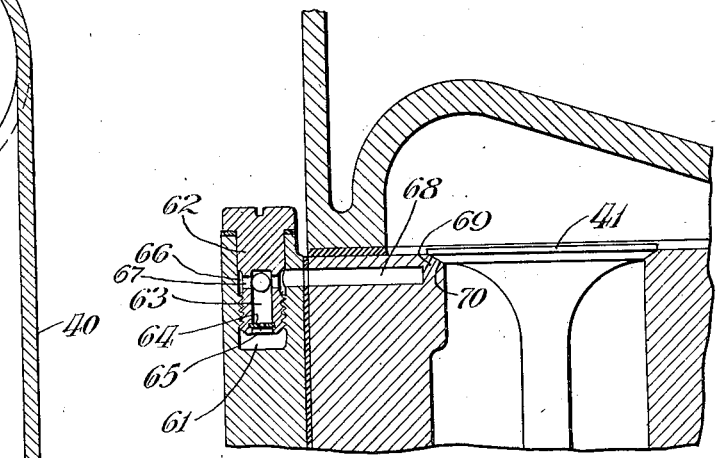
Fig. 6.
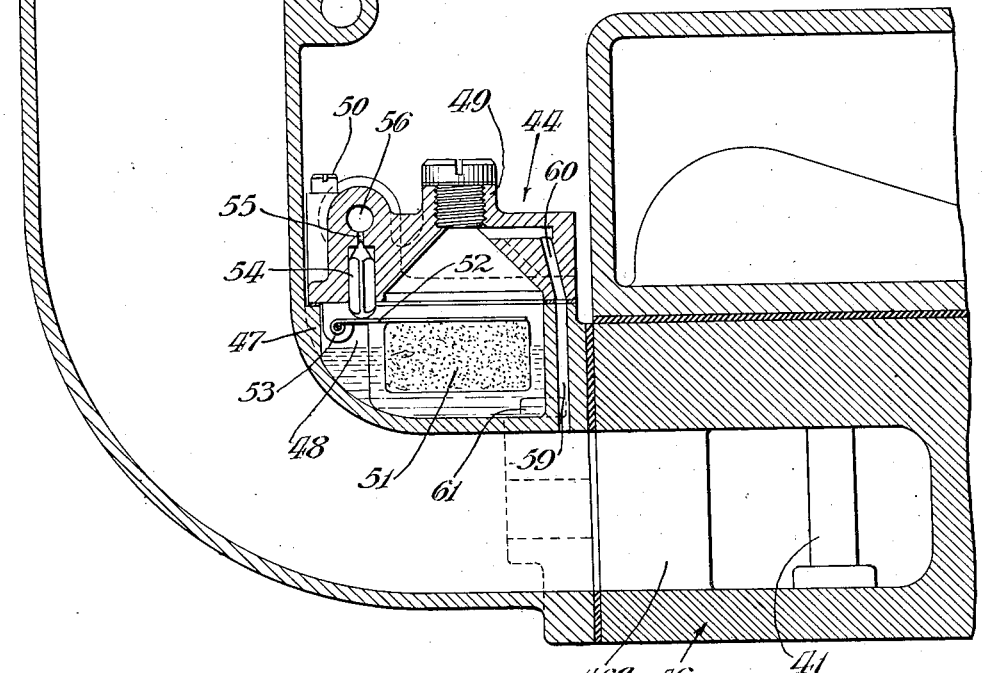
Inventor:
Percival S. Tice
By Rector, Hibben, Davis & Macauley
Attorneys.

March 10, 1936. P. S. TICE 2,033,211
FUEL SUPPLY SYSTEM
Filed March 23, 1932 5 Sheets-Sheet 5

Inventor:
Percival S. Tice
By Rector, Hibben, Davis & Macauley
Attorneys.

Patented Mar. 10, 1936

2,033,211

UNITED STATES PATENT OFFICE 2,033,211

FUEL SUPPLY SYSTEM

Percival S. Tice, Chicago, Ill.

Application March 23, 1932, Serial No. 600,699

29 Claims. (Cl. 123—119)

My invention relates to a fuel supply system for internal combustion engines and has to do especially with engines of the multi-cylinder type.

The limitations and faults of prior systems of this character employing the usual carburetor and fuel distributing intake manifold are well known. For example, among other things, material restrictions are imposed upon the volumetric efficiency (ratio of cylinder filling) of the engine due to the reductions of effective passage section deemed essential to even approach proper fuel metering and fuel distribution. Limitations are imposed on the amount of air supply. There is lack of uniformity in air supply—all of which is a factor in loss of power. In such systems, even under most favorable operating conditions, equalization in fuel and mixture distribution to all of the engine cylinders is not accomplished. Intake manifold heating is employed as an essential factor in reducing the liquid fuel content of the intake manifold to a point where the distribution of the fuel among the cylinders will usably approach equalization. However, this heating further reduces volumetric efficiency, as will be well understood.

Furthermore, in these prior systems, it is practically impossible to apply at the carburetor those mixture proportions which will result in the most effective use of the fuel and at the same time maintain satisfactory engine operation. This is due to the errors in fuel distribution which are inherent in systems of this character. More particularly, the optimum mixtures (in the sense of highest fuel utilization) are always much nearer the lean or upper limit of combustibility than the rich or lower limit; and, as these limits are approached, the rates of combustion reduce rapidly and at a much higher rate than for a like change of mixture proportion near the so-called mid-range of combustibility. Hence, when the carburetor of prior systems is adjusted to deliver optimum mixtures, the unavoidable inequality in fuel distribution in the intake manifold is ordinarily great enough to cause some of the cylinders to operate on such a lean mixture that their effectiveness, at least, is reduced; and the only recourse under such circumstances is enrichment of the mixture at the carburetor with resultant wide departure from optimum mixtures in those cylinders getting the richer charges.

Still further, in prior systems employing the fuel intake manifold, the fuel ejected thereinto is not immediately available in the cylinders due, in part, to the necessity of first establishing within such manifold a predetermined degree of so-called "wetness". This naturally results in delayed engine starting; and, in attempting to relieve this condition, various so-called accelerating wells, pumps, or the like have been resorted to with consequent waste in fuel, etc. For similar fundamental reasons, once the engine has been started in operation and the desired degree of "wetness" is established in the manifold, closure of the throttle produces "loading" of the cylinders with excess fuel with resultant tendency toward engine stalling.

Another limitation of prior systems of the foregoing character is the necessity of employing comparatively low expansion ratios to avoid detonation or knocking since such systems, owing to intake heating, are inclined toward high compression temperatures which tend to cause this objectionable condition. As a result of all the foregoing, among other, faults of these prior systems the efficiency of the engine as a whole is of comparatively low order; fuel waste and improper combustion take place; and power is lost under all load and operating conditions.

One of the objects of my invention is to overcome all of the foregoing faults of prior fuel supply systems, at the same time providing for increased volumetric efficiency and, consequently, higher engine efficiency.

Another object is to improve the performance of internal combustion engines with respect to specific output (useful work performed per unit of displacement) and the specific fuel consumption (rate of fuel consumption per unit of useful work). My invention provides for the full charging of each and every cylinder with that amount of air requisite for its existent combustion needs, as well as equality in distribution of fuel to each and every cylinder; and it further provides for the proper mixture ratio for each cylinder under all load and operating conditions. Optimum mixture proportions are applied to each and every cylinder, the enrichment demanded by charge dilution incident to throttle control being automatically controlled and applied. All of the foregoing practically insures intended power development in each cylinder resulting in increased engine power per unit of fuel used.

A further object is to eliminate the use of the usual carburetor, fuel intake manifold, intake heating means, and the fuel distribution errors inherent in their use, and in the accomplishment of this object my invention contemplates the use of a separate and independently-metered fuel supply means for each cylinder, each cylinder being subject to equalized mixture control whereby uniformity as to quantity and quality of mixture, with respect to each cylinder, is insured.

Still another object is to locate the fuel supply for each cylinder in close proximity thereto, and to provide for separate delivery of both air and fuel, directly to each cylinder from their respective sources, and to effect spraying of the fuel and its initial mixing and vaporization with the air substantially at their point of entry into each cylinder. In carrying out this object, I contemplate the utilization of the intake valve for each cylinder as a medium for controlling the feed of both the air and fuel into the cylinder as well as for spraying of the fuel and its initial mixture with the air.

An additional object is to provide for delivery of the air charges of proper quantity and density directly to each cylinder in a cool state without preheating, and to provide for vaporization of the fuel at the cylinder so that the heat involved in vaporization is taken wholly from the cylinder content and the cylinder and combustion chamber walls.

A further object is to so relate the fuel supply to each respective cylinder that the fuel is immediately available for delivery into the cylinders under throttle control without compensation for surface "wetness" conditions wherefore easy and practically instantaneous starting is insured and engine "loading" and stalling are prevented.

More specific objects are to provide a system in which I associate with each cylinder a fuel supply chamber connected thereto by a relatively short and properly-sized and metered fuel passage which discharges into the cylinder through one or more ports located in the intake valve seat so as to be opened and closed by such intake valve in its normal operation; to provide an arrangement of the foregoing character wherein the pressures in the fuel chamber and air intake manifold are equalized substantially without subjecting the fuel chamber to pressures due to abnormal impacts in the air intake manifold; to provide for better diffusion and mixture of the fuel and air insuring improves combustion; to provide for full charging of each cylinder with air under maximum load conditions; and to provide for improved operation throughout the entire speed range of the engine.

Other objects and advantages will become apparent as this description progresses and by reference to the drawings wherein,—

Figure 1 is a schematic diagram of a fuel supply system including parts arranged in accordance with my invention;

Fig. 2 is a top plan view of one form of fuel supply unit embodying my invention and adapted to control the supply of fuel to siamesed intake ports of a multiple cylinder engine, a portion of the cylinder block structure of which is shown in horizontal section;

Fig. 3 is a section taken substantially on line 3—3 of Fig. 2;

Fig. 4 is a section taken substantially on line 4—4 of Fig. 3;

Fig. 5 is a section taken substantially on line 5—5 of Fig. 2;

Fig. 6 is a section taken substantially on line 6—6 of Fig. 2;

Figure 9:
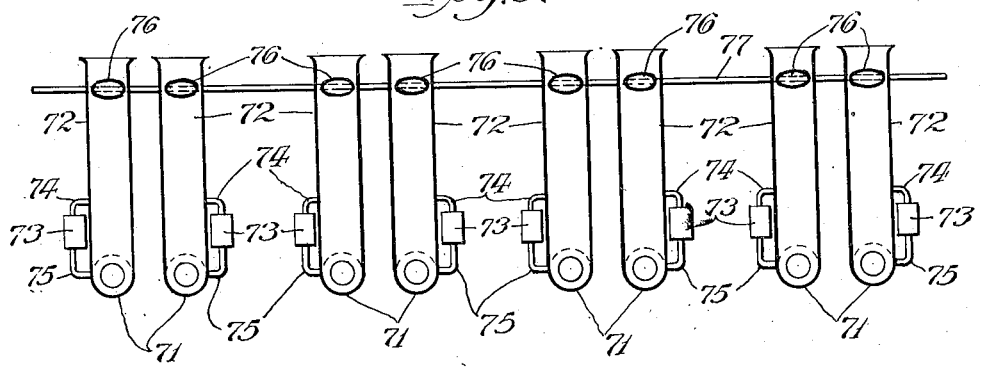
Figs. 9 to 15 inclusive are, respectively, diagrammatic representations of modified arrangements of my invention.
Figure 10:
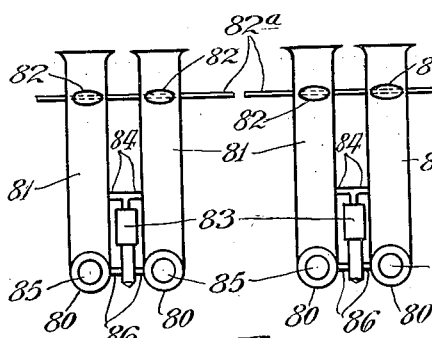
Figure 14:
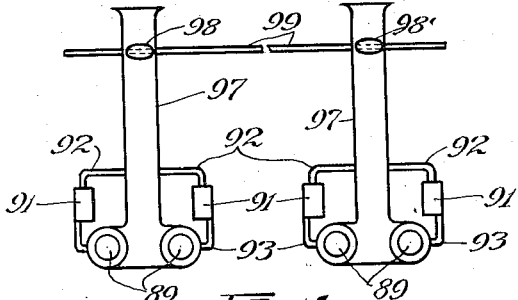

My invention, in its broader aspect, referring particularly to Fig. 1, contemplates the use of an air intake tube or conduit 20 which may be connected to a header 36 (such as illustrated in Fig. 1) common to a plurality of similar engine cylinder air intake tubes, or may lead directly to atmosphere and receive its air supply independently of all the other cylinders (such as illustrated in Figs. 9, 10 and 14). This tube or conduit is of adequate sectional area and is sufficiently free of sharp, obstructive bends, and the like, to insure a free and unrestricted flow of that requisite amount of air therethrough to meet full-charging needs of the engine under all (including full load) operating conditions. A throttle valve 21 located in the header 36 (or directly in the tube) and adjustable under the control of the operator regulates, in a well known manner, the amount of air fed to the engine for proper fulfillment of its functions. This air tube 20 communicates with the atmosphere as at 22 and leads directly to an intake valve 23 which is opened and closed in the usual manner to control the feed of air into the combustion chamber 24. Fuel, which may be gasoline, or the like, is fed from a suitable source (not shown) through a main supply pipe 25 and branch pipe 26 to a fuel chamber 27. The level of the fuel in this chamber is controlled by a float 28 actuating a valve 29 to close the inlet passage 26 when the fuel in said chamber reaches a predetermined level. The fuel is fed from the chamber 27 through a relatively short passage 30, size-controlled by the metering plug 31, to a discharge port 32 located in the intake valve seat 33. The fuel passage 30 connects with the fuel chamber preferably at the bottom of the latter and the fuel chamber, passage 30 and the intake valve seat are so related with respect to location that the maintained fuel level in the fuel chamber brings the fuel to a point in the fuel passage 30 quite close to the fuel discharge port 32; wherefore the feed of fuel through the discharge port 30 is immediately responsive to the control of the operator. The axis of the discharge port 32 is, preferably, normal with respect to the valve seat for best control of discharge of the fuel, but this relationship may be varied somewhat, particularly in view of the directed flow of the air past the intake valve 23 and the shape relationship of the surfaces contacted thereby.

The fuel chamber 27 is pressure-equalized with the air manifold 20 through a conduit or equalizing passage 34 which is arranged with the axis of its inlet and 34ª normal to the axis of the adjacent section of the air conduit 20, so that variations of pressure (impacts or otherwise) in the column of air contained in the tube 20 resulting from causes other than the flow of air incident to charging of the cylinder are without effect upon the flow of fuel from the fuel chamber. This equalizing passage or conduit 34 is of sufficient section to permit rapid change of pressure in the fuel chamber so that a relationship between the flow of air and fuel is automatically maintained at that fundamentally appropriate to the conditions of use. With the pressure in the fuel chamber and the air tube equalized, as the normal pressure in the stream of air flowing to the cylinder varies, the pressure acting on the liquid in the fuel chamber directly serving the fuel to that particular cylinder also varies so as to automatically maintain a feed of fuel through the passage 30 and discharge port 32 in the proper mixture relationship to the air fed.

With the foregoing arrangement, the air intake tube 20 serves only as an air conveying means, and it may be used equally well with selectively supercharged or wholly supercharged engines. Air is delivered directly to each cylinder under the control of its intake valve 23. Since the fuel discharge port 32 is wholly contained within the limits of the intake valve seat, the intake valve serves as a means for cutting in and out the supply of fuel to the cylinder; the arrangement being such that fuel is fed to the cylinder only at those times when it should be fed and in that quantity determined directly by the quantity and density of the air flowing past the intake valve. The fuel may be discharged through a single port 32, or through a plurality of such ports located in the valve seat 33 and properly sized and fed from a suitable chamber 35 in the valve seat which is, in turn, connected to and fed by the fuel passage 30.

Furthermore, in providing the foregoing features for each of the cylinders of a multiple cylinder engine, equality in fuel distribution among the cylinders is insured. This, coupled with the feed of an adequate amount of air at lowest possible temperature directly to the cylinder, insures higher specific outputs (and lesser fuel consumption rates) over a wider speed range than heretofore obtained with known structures. The charge temperatures in the cylinders, during and at the end of the compression stroke, when employing my invention, are considerably less than ordinary for a given expansion ratio, because the air portions of the charges entering the cylinders are at a comparatively low temperature and, by delivering the fuel and air directly to the cylinder in their normal states, the whole of the heat involved in the vaporization of the fuel is taken from the cylinder content and from the cylinder and combustion chamber walls, thereby reducing compression temperatures and making possible the use of appreciably greater expansion ratios (piston sweep related to clearance volume) without detonation or knocking,— all of which is an important factor in increasing specific output and reducing specific fuel consumption.

By bringing the liquid fuel supply into close proximity to each cylinder so that its travel to the cylinder is through a very short passage and vaporization and diffusion of the fuel takes place at the entrance to and directly in the cylinder, practically instantaneous starting is provided for under all operating conditions, and the need of accelerating wells, pumps, and the like, to compensate "wetness" conditions (such as existent where the usual fuel distributing manifold is employed) is eliminated. Further, since no "witness" condition need be compensated for, "loading" and also engine stalling upon closure of throttle are eliminated.

The serving of each cylinder with fuel by an independent or independently-sized fuel passage (such as indicated at 30) is a material feature of my invention. This feature makes possible the insurance of equal qualities (ratios of fuel to air) of fuel mixture in each cylinder. Obviously, where all of the cylinders receive equal air charges, each fuel passage is made to deliver the same quantity of fuel to maintain qualitatively the same mixture; and, according to my invention, I provide, as will be seen hereinafter, for the delivery of substantially equal air charges to each cylinder so that all cylinders function in a uniform manner.

In operation, air is delivered through the intake 20 to the intake valve 23 and as this valve opens, fuel and air in proper mixture relationship are fed into the combustion space 24. The valve 23 serves to restrict the intake port and to establish a variable air and fuel velocity dependent upon the degree of opening of such valve and upon the accompanying piston displacement. The velocity thus establishable is in excess of that obtainable at the fuel discharge point with prior known devices. The difference in pressure as applied to the two ends of each fuel supply passage 30 (the fuel chamber 27 and the fuel outlet 32 in the intake valve seat, respectively) operates in a well-known manner to cause ejection or aspiration of fuel from the fuel outlet 32, thus initiating spraying, vaporization and diffusion of the fuel and the carbureting of the air (the flow of which causes and controls the ejection of the liquid fuel). More particularly, the differences of pressure above stated, providing the "heads" under which the fuel is ejected, result from the effective differences of section of the air tube or conduit 20 at the junction 34ª of the pressure equalizing passage 34 therewith and the section of the intake valve opening through which the air is caused to flow; that is, while the effective section of the intake valve opening, due to opening and closing of the valve to variable extents, varies from zero to maximum, it is always less than the effective section at the junction of the equalizing passage 34 with the air tube. In step with this variation of effective area of valve opening is the velocity of the piston within the cylinder. Inherently these relationships impose a constant relation between the amount of fuel ejected and the amount of air aspirated, at a given mean value of the density of the air stream in the air supply passage, and at constant area of section in the restricted or metered portion of the fuel supply passage 30. Hence, to place the qualitative relation, the mixture ratio, at desired value, it is only necessary to employ a suitably sized metering restriction or plug 31 in the fuel supply passage 30.

The amount of air is fed directly under throttle control and closing movement of the throttle (such as indicated at 21, Fig. 1) inherently causes an enrichment of the mixture, since at a given air velocity (engine speed) the metering head effective across the fuel supply passage varies as the density of the air flowing. In the use of my invention, however, this enrichment is almost exactly that required to bring about the continuance of most favorable combustion rates in the face of increasing dilution of the new charge with residual combustion products as the density of the new charge is reduced by throttling. Further, with the above-described arrangement optimum mixture proportions may be applied and uniformly maintained with respect to each and all of the cylinders and the enrichments of the mixture fundamentally demanded by charge dilution incident to throttling control are essentially and automatically applied, without fuel waste, by factors obviously inherent in the structure above described. Furthermore, by providing for a full and free flow of air to each cylinder, each cylinder gets its full quantity of air demanded by the particular existent combustion needs, under even full load operating conditions; hence, full power development from each charge in each cylinder is insured.

Various other arrangements of my invention may be resorted to and, in Figs. 2 to 8 inclusive, I have shown another embodiment of my invention as applied to a 6-cylinder engine (but not limited thereto) wherein the intake ports of adjacent cylinders are arranged in siamese relation. Specifically, with reference to Figs. 7 and 8, I may employ an open-ended air header 37 which communicates with atmosphere under the control of a single throttle valve 38 at one end of the header. To the header 37 I connect a plurality (three in this instance) of air tubes or conduits 40, each of which supplies air to two intake valves 41, 42 of adjacent cylinders 43. A single fuel supply chamber 44 and a single equalizing passage 45 connecting the air conduit 40 and fuel chamber 44 are employed for each set of paired cylinders. However, as will appear more particularly hereinafter, each fuel supply chamber feeds to each of its respective cylinders through separate and independently metered fuel supply passages.

In Figs. 2 to 6 inclusive I have shown in detail a preferred construction of air and fuel supply unit well serving the foregoing purpose and the same will now be described. This structure constitutes a self-contained unit which may be secured to the cylinder block 46 in any desired manner so that the air conduit 40 communicates with the intake passage 46ª beneath intake valve 41. The upper side of the lower part of the air conduit 40 is provided with a casing portion 47 constituting a fuel reservoir 48, the top of which is closed by a suitable cap structure 49 secured thereto by screw bolts 50. A float 51 has an arm 52 pivotally supported at 53 within the reservoir 48, and this arm 52 supports and actuates a valve 54 adapted to close the fuel inlet port 55 when the level of the fuel in the fuel reservoir reaches a predetermined point. The fuel supply port 55 communicates with a fuel supply passage 56 which, in turn, is connected to a fuel supply pipe 58 (Figs. 7 and 8) common to the other fuel chambers 44. The fuel casing 47 is provided with a passage 59 which communicates at one end with the air conduit 40 and at its other end with a passage 60 in the cap 49 communicating with the interior of the fuel chamber, the passages 59 and 60 serving as an equalizing passage similar to the equalizing passage 34 of Fig. 1. It will be noted that the axis of the inlet end of the passage 59 is substantially normal with respect to the axis of the adjacent section of the air conduit for reasons already pointed out. The bottom of the fuel reservoir 48 is provided at opposite sides with ports 61 (Figs. 3 and 6) each of which communicates with a separate vertically-disposed chamber in each of which is removably threaded a plug 62. This plug has an axial passage 63 leading to its inward end in which is mounted a metering plug 64 having an orifice 65 of desired size. The plug 62 is provided with an exterior annular groove 66 adjacent the upper end of its passage 63 which groove communicates with the plug passage through ports 67. The groove 66, in turn, communicates with a short passage 68 in the cylinder block terminating in a relatively small fuel discharge port 69 having its discharge end located wholly in the intake valve seat 70. The operation and advantages of this particular form of structure are the same as mentioned in connection with the structure of Fig. 1, except for the fact that a common air header is employed and two cylinders are supplied with fuel and air by a single air tube or conduit and a single fuel chamber, and each fuel chamber feeds fuel to the separate cylinders of each pair through separate and independently sized passages. It will be noted that the structural relationship of the parts is such that the normal fuel level in the fuel reservoir brings the level of the fuel in the fuel feed passage 68 into close proximity to the cylinder for immediate fuel supply response.

Figure 11:
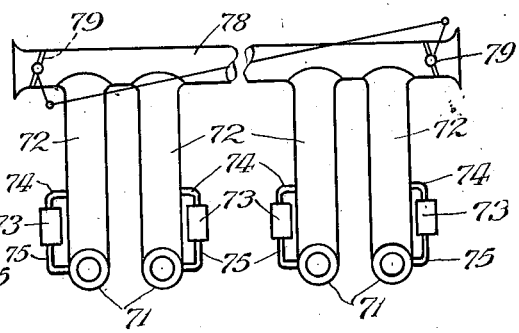

My invention is adaptable to engines of any desired number of cylinders, and various other combinations may be effected within the scope of my invention. For exemple, referring particularly to Fig. 9 illustrating an 8-cylinder engine, each cylinder 71 is supplied with air through a separate air tube 72 independently connected to atmosphere, each cylinder having its own separate, independent fuel supply chamber 73. Each fuel chamber is pressure equalized with its own air tube through a passage 74, and each fuel chamber is connected to its respective cylinder by a separate and independent fuel supply passage 75 in a manner such as shown in Fig. 1 or Figs. 5 and 6. Furthermore, each air tube 72 has its own independent throttle valve 76, all of which valves are controlled in unison by a suitable operating rod, or the like, 77 operable under the control of the operator. This same arrangement of fuel chambers, and equalizing passages may be employed with the separate air conduits 72 connected to a common header 78 controlled by throttle valves 79 (operated in unison) as illustrated in Fig. 11. Or, if desired, I may employ a header such as shown in Figs. 7 and 8.

Figure 12:
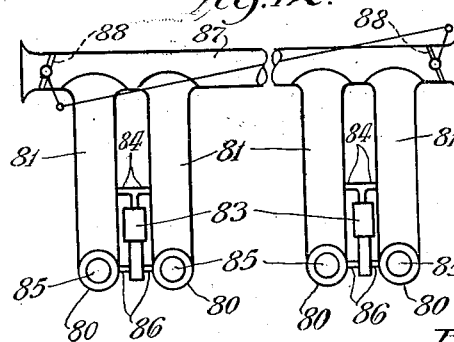

Another arrangement is shown in Fig. 10, wherein the cylinders 80 are each supplied with air by separate air tubes 81 independently connected to atmosphere and individually throttled by valves 82 controlled in unison by an operating member 82ª. In this form, the air intake tubes are so paired that a single fuel chamber 83 is employed for each pair of tubes 81, in which case, however, each fuel chamber is pressure equalized with both air tubes through separate branch passages 84, and is connected to the intake valves 85 of both cylinders through separate and independently-sized fuel passages 86. In this form, also, construction and operation of the fuel supply unit may be the same as described in connection with Figs. 1 to 8, inclusive. This same arrangement of air tubes, fuel chamber, equalizing passages, and fuel supply passages may be employed with a common header 87 connected to the several air tubes 81, which header is controlled by unison-operated throttles 88 located in each end thereof, as shown in Fig. 12.

Figure 13:
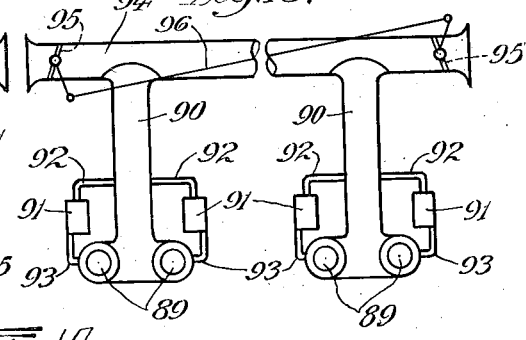

Still further with respect to Fig. 13 wherein the intake valves 89 are arranged in siamesed relation, I may employ a single air tube 90 supplying both intake valves 89; and an independent fuel supply chamber 91 for each intake valve with each fuel chamber pressure equalized with the air tube through separate, independent passages 92 and connected to the intake valves 89 through separate and independently-sized fuel passages 93. In this form, the air tubes 90 are connected to a common header 94 controlled by one or more throttle valves 95 adapted to be operated in unison by a rod, or the like 96. This same arrangement of siamesed intake valves, separate fuel chambers and common air supply may be employed in an arrangement, such as shown in Fig. 14, wherein each separate air tube 97 is independently and directly connected to atmosphere, and each tube is independently throttled as at 98. The throttles 98 are controlled in unison through the medium of a rod 99 or the like.

Figure 7:
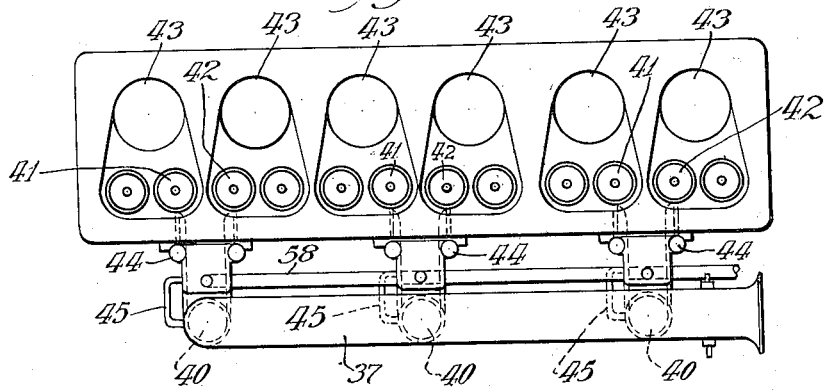
Fig. 7 is a semi-diagrammatic top plan view representing a 6-cylinder engine with siamesed intake ports, each siamesed pair having associated therewith a fuel supply unit of the character shown in Figs. 2 to 6, inclusive.
Figure 8:
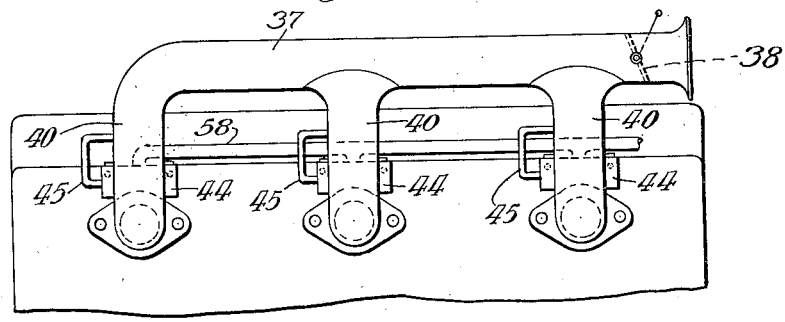
Fig. 8 is a semi-diagrammatic side elevational view of the arrangement shown in Fig. 7.
Figure 15:
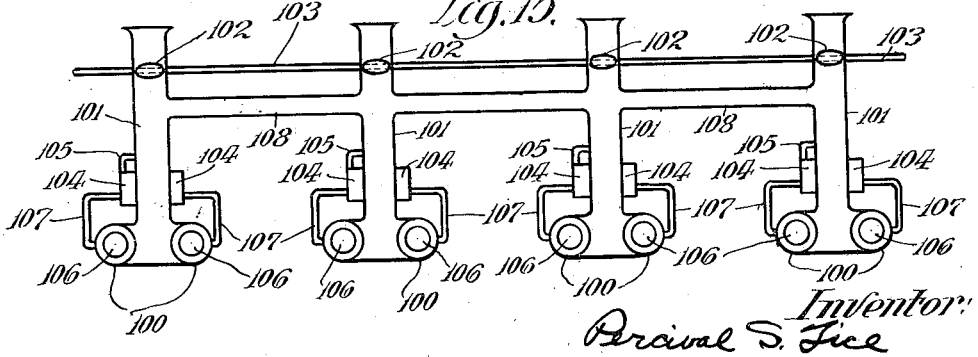

In Fig. 15 I have illustrated diagrammatically the same siamesed intake port arrangement as illustrated in Figs. 7 and 8 except that each pair of cylinders 100 is supplied with air by a separate air intake tube 101 independently connected to atmosphere, the several air intake tubes being controlled individually by throttle valves 102 operated in unison by a control rod, or other suitable means, 103. A single fuel chamber 104 pressure equalized with the air tube 101 through passage 105 and connected to both intake valves 106 through separate and independently-sized fuel passages 107 is employed. I have found this arrangement of particular value, and may preferably use the same, in multi-cylinder engines with siamesing arrangements wherein the suction periods of certain of the cylinders overlap. With each separate and independent air tube supplying two cylinders, such cylinders are protected or segregated at open throttle or full load from the overlapping suction periods of the others. For example, in certain instances where the firing order of the cylinders is such that adjacent pairs of cylinders fire in succession with consequent overlapping suction periods, one tends to deprive the other of air where a common header, such as shown in Figs. 7 and 8, is employed for distribution of air to all of the cylinders. The use of separate and independent air intakes for each cylinder or each pair of siamesed cylinders prevents the foregoing condition and insures at all times the proper feed of air to each cylinder under all load conditions. However, it is to be understood that the common header arrangement such as shown in Figs. 7, 8, 11, 12 and 13, may be effectively employed with the attainment of improved efficiency notwithstanding overlap of the suction periods of certain of the cylinders.

In certain instances, particularly where independent air intake tubes are employed, as in Fig. 15, I preferably interconnect the air intake tubes so that under close throttle, or small load, operating conditions the then-reduced intake pressure in each air intake manifold is maintained at approximately its then mean value throughout the system, irrespective of which cylinder or cylinders are actively taking charges. Referring particularly to Fig. 15, this may be accomplished by tubes or passages 108 interconnecting the tubes 101 intermediate the ends of the latter. The desirability of this equalization of air pressures in each air intake under small load conditions, arises from the fact that, where the cylinders or intake valves are siamesed and each of these have different periods of activity and inactivity, the air pressure in the air intake common to two cylinders of each pair (under close throttle or small load) varies resulting in unequal air charging of the two cylinders, the first cylinder to take its charge having a supply of air of higher density to draw from as compared with the cylinder immediately following it. The interconnecting of the independent air intakes eliminates this effect by keeping all parts of the intake system at the mean pressure level independent of the extent of throttling, throughout the "rest period" occurring in each supply passage.

The objects and advantages of my invention above first stated will be obvious from the foregoing. The performance of the engine with respect to specific output and specific fuel consumption is improved. Greater power is developed per unit of fuel. Fuel waste is reduced to a minimum, combustion is improved, cost of operation and maintenance is reduced, and satisfactory and uniform engine performance is practically insured under all operating conditions. Further, it is to be understood that, while I have shown several different arrangements of my invention, other changes in details and arrangements of parts may be made therein without departing from the spirit and scope of my invention as defined by the claims which follow.

I claim:

1. In a fuel supply system, the combination with an intake valve and its seat, of a fuel chamber, means providing a comparatively short and metered passage leading from said chamber, and terminating in said intake valve seat, an independent air admission conduit having its discharge end controlled by said intake valve, a conduit interconnecting said fuel chamber with said air admission conduit at a point remote from said intake valve, and throttle means controlling the flow of air through said air conduit, said air admission under control of said intake valve controlling flow of fuel through said fuel passage.

2. In a fuel supply system, the combination with an intake valve and its seat, of a fuel chamber, means providing a passage of predetermined fixed size leading from said chamber with its discharge end terminating in said intake valve seat, an independent air admission conduit having its discharge end controlled by said intake valve whereby mixture of the air and fuel takes place only as they pass said intake valve, and means connecting said air conduit with said fuel chamber above the fuel in the latter and at a point in said air conduit removed from said intake valve for maintaining equalized air pressure in said air conduit and fuel chamber.

3. In a fuel supply system, a fuel chamber, a conduit through which fuel is fed from said chamber directly to one of the engine cylinders, an air conduit independent of said fuel conduit leading directly to said one cylinder, means controlling admission of air to said air conduit, common means controlling entry of air and fuel from their respective conduits into said cylinder where they are initially intermixed, and means connecting said air conduit to said fuel chamber above the level of the fuel in the latter to equalize the pressures therein, respectively.

4. In a fuel supply system for internal combustion engines, an air supply conduit directly connected with an intake port in one of the cylinders, an intake valve controlling flow of air from said conduit to said intake port, a fuel chamber located in close proximity to and at substantially the height of said intake port, a fuel conduit connecting said fuel chamber with said intake port independently of said air conduit, means in said fuel chamber maintaining the fuel therein at substantially the level of said intake port, said intake valve also controlling admission of fuel from said fuel conduit directly into the cylinder through said intake port along with the air admitted thereby.

5. In a fuel supply system for internal combustion engines, an air supply conduit directly connected to an intake port in one of the cylinders, an intake valve controlling admission of air from said conduit through said intake port, a fuel chamber located in close proximity to said intake port, means providing a short passage connecting said fuel chamber with said intake port independently of said air conduit, said intake valve also controlling admission of fuel from said fuel conduit directly into the cylinder through said intake port along with the air admitted thereby, and another conduit connecting said air conduit with said fuel chamber above the fuel in the latter for equalization of pressure therein, respectively.

6. In a fuel supply system for internal combustion engines, an air supply conduit connected directly to atmosphere and to an intake port in one of the cylinders, an intake valve controlling admission of air through said intake port, a fuel chamber located in close proximity to said intake port, means providing a fuel passage connecting the lower portion of said fuel chamber with said intake port independently of said air conduit and for feeding liquid fuel directly to said intake port, the relation between said fuel chamber, fuel conduit and intake valve being such that the level of the fuel in said fuel passage is maintained substantially at the level of said intake port for immediate delivery of liquid fuel to the latter when said intake valve is opened, and means equalizing air pressure in said fuel chamber and said air conduit.

7. In a fuel supply system for internal combustion engines, means providing an air intake passage leading from the atmosphere directly to one of the cylinders, an intake valve seated in the discharge end of said air intake passage for closing and varying the extent of opening thereof, a fuel chamber, a fuel conduit leading from said chamber and discharging into said air intake passage at that point therein controlled by said valve whereby said valve is opening and closing said air intake passage opens and closes the discharge end of said fuel conduit, and an equalizing conduit connecting said fuel chamber with said air intake passage, the sectional area of said air intake passage at its point of connection with said equalizing conduit being greater than the maximum sectional area of the opening defined by said valve in the discharge end of said air intake passage.

8. In a fuel supply system for internal combustion engines of the multi-cylinder type, an air intake valve for each cylinder, means for feeding air in a cool state to each said intake valve, means providing a separate and independently-sized fuel passage connected to each cylinder at its said intake valve and controlled by the latter, means for feeding fuel in liquid state through each said passage to its respective intake valve, the arrangement being such that air and fuel are initially mixed at said intake valve, and means leading from said air feeding means remote from said air intake valve for pressure equalizing the fuel feeding means with the air feeding means.

9. In a system of the class described, an intake port for and leading directly into each cylinder, each said port having a valve seat therein, an intake valve for and cooperating with each said seat to open and close said port, means including a conduit and a valve therein for supplying air to said port, means including a discharge passage extending upwardly toward and terminating directly in said valve seat for supplying liquid fuel to said port, said intake valve controlling entry of both fuel and air into the cylinder as well as spraying of the fuel and its initial mixture with the air, and means equalizing the pressure of the air acting on said fuel supply means and that fed by said air supplying means.

10. In a fuel supply system for internal combustion engines of the multi-cylinder type, a conduit for supplying air directly and independently to each cylinder, a separate and independent fuel chamber for each cylinder, means for maintaining a fuel level in said fuel chamber, a separate and independently-sized fuel conduit connecting each cylinder with its respective fuel chamber, an intake valve for each cylinder controlling admission of air and fuel thereto, and means equalizing the pressure of said air conduit with each said fuel chamber.

11. In a fuel supply system for internal combustion engines of the multi-cylinder type, means for supplying air directly to each cylinder, a separate fuel chamber for each cylinder, a separate and independently-sized fuel conduit connecting each cylinder with its respective fuel chamber, an intake valve for each cylinder controlling admission of air and fuel thereto, the arrangement being such that the fuel and air are initially mixed at said intake valve, means equalizing the pressure of the air supplying means with the pressure in each said fuel chamber, and a common throttle control means for regulating the amount of air fed by said air supplying means to all of the cylinders.

12. In a fuel supply system for internal combustion engines of the multi-cylinder type, means for supplying air directly to each cylinder, a single fuel chamber supplying each set of two of said cylinders, a separate and independent fuel conduit connecting each cylinder of each set with its respective fuel chamber, an intake valve for each cylinder controlling admission of fuel and air thereto, and separate means equalizing the pressure of the air supplying means for each cylinder of each set with the fuel chamber for said set respectively.

13. In a fuel supply system for internal combustion engines of the multi-cylinder type, means for supplying air directly to each cylinder, a single fuel chamber supplying each set of two of said cylinders, a separate and independent fuel conduit connecting each cylinder of each set of two with said fuel chamber, an intake valve for each cylinder controlling admission of fuel and air thereto, separate means equalizing the pressure of the air supplying means for each cylinder of each set of two with the respective fuel chamber supplying such set, and a common throttle control means for regulating the amount of air fed by said air supplying means to each cylinder.

14. A fuel supply system for an internal combustion engine of the multi-cylinder type having the intake ports of adjacent cylinders arranged in siamesed relation, which comprises a single air tube supplying air directly to both of the intake ports of each siamese pair, a separate fuel chamber for each cylinder, a conduit independently connecting each fuel chamber with the intake port of its respective cylinder, the fuel chambers of each siamese pair being independently connected to said air tube for equalization of pressure therein, and an intake valve for opening and closing each said intake port.

15. A fuel supply system for an internal combustion engine of the multi-cylinder type having the intake ports of adjacent cylinders arranged in siamesed relation, which comprises a single air tube supplying air directly to both of the intake ports of each siamese pair, a separate fuel chamber for each cylinder, a separate and independently-sized conduit connecting each fuel chamber with the intake port of its respective cylinder, the fuel chambers of each siamese pair being independently connected to said air tube for equalization of pressure therein, an intake valve for opening and closing each said intake port, and throttle control means common to all said air tubes for controlling the quantity of air admitted.

16. A fuel supply system for an internal combustion engine of the multi-cylinder type having the intake ports of adjacent cylinders arranged in siamesed relation, which comprises a single air tube supplying air directly to both of the intake ports of each siamese pair, a single fuel chamber for both cylinders of each siamese pair, a separate and independently-sized conduit connecting said fuel chamber with the intake port of each cylinder whereby air and fuel are initially mixed at the intake port of each cylinder, the fuel chamber of each siamese pair being independently connected to its respective air tube for equalization of pressure therein, and an intake valve for opening and closing each said intake port.

17. A fuel supply system for an internal combustion engine of the multi-cylinder type having the intake ports of adjacent cylinders arranged in siamesed-relation, comprising a single air conduit independently and directly connecting the intake ports of each siamese pair with the atmosphere, a single fuel chamber for each siamese pair of cylinders pressure equalized with said air conduit of each siamese pair, separate and independently-sized conduits connecting said fuel chamber of each pair with the intake ports of each siamese pair, the air conduit for each siamese pair being connected intermediate its ends with the corresponding air conduits of the other siamese pairs, and a valve controlling each said intake port where the fuel and air are initially mixed.

18. A fuel supply system for an internal combustion engine of the multi-cylinder type having the intake ports of adjacent cylinders arranged in siamesed relation, comprising a single air conduit independently and directly connecting the intake ports of each siamese pair with the atmosphere, a single fuel chamber for each siamese pair of cylinders pressure equalized with the said air conduit of each siamese pair, separate and independently-sized conduits connecting said fuel chamber with the intake ports of each siamese pair, the air conduit for each siamese pair being connected intermediate its ends with the corresponding air conduits of the other siamese pairs, a valve controlling each said intake port, a throttle valve for each said air conduit, and means for controlling all said throttle valves in unison.

19. A fuel supply system for an internal combustion engine of the multi-cylinder type having the intake ports of adjacent cylinders arranged in siamesed relation, comprising a single air conduit independently and directly connecting the intake ports of each siamese pair with the atmosphere, fuel reservoir means associated with each siamesed pair, a separate and independently sized fuel-supply passage connecting the intake ports of each siamesed pair with said fuel reservoir means, the arrangement being such that the fuel and air are initially mixed at said intake ports, and conduit means interconnecting the adjacent of said separate air conduits with each other intermediate their inlet and discharge ends.

20. In a fuel supply system for internal combustion engines of the multi-cylinder type, a separate air tube directly connecting each cylinder with the atmosphere, a separate and independent fuel chamber for each cylinder, a separate and independently-sized fuel conduit of constant capacity connecting each cylinder with its respective fuel chamber, an intake valve for each cylinder controlling admission of air and fuel thereto, and means equalizing the pressure of each said air tube with the fuel chamber for its respective cylinder.

21. In a fuel supply system for internal combustion engines of the multi-cylinder type, a separate air tube connected directly to each cylinder, a common header connected directly to atmosphere and to which all said air tubes are connected, throttle means associated with said header, a separate and independent fuel chamber for each cylinder, a separate and independently-sized fuel conduit connecting each cylinder with its respective fuel chamber, an intake valve for each cylinder controlling admission of air and fuel thereto, and means equalizing the pressure of each said air tube with the fuel chamber for its respective cylinder.

22. In a fuel supply system for internal combustion engines of the multi-cylinder type, air tubes connected directly to the cylinders, a common header connected directly to atmosphere and to which all said air tubes are connected, throttle means associated with said header, a single fuel chamber supplying each set of two of said cylinders, a separate and independent fuel conduit connecting each cylinder of each set with its respective fuel chamber, an intake valve for each cylinder controlling admission of fuel and air thereto, and separate means equalizing the pressure of each said air tube for each cylinder of each set with the fuel chamber for said set respectively.

23. A fuel supply system for an internal combustion engine of the multi-cylinder type having the intake ports of adjacent cylinders arranged in siamesed relation, which comprises a single air tube leading directly from atmosphere to and independently connecting with the intake ports of each siamesed pair, a separate throttle valve for each said tube, means for controlling all said throttle valves in unison, a separate fuel chamber for each cylinder, a conduit independently connecting each fuel chamber with the intake port of its respective cylinder, the fuel chambers of each siamese pair being independently connected to said air tube for equalization of pressure therein, and an intake valve for opening and closing each said intake port.

24. A fuel supply system for an internal combustion engine of the multi-cylinder type having the intake ports of adjacent cylinders arranged in siamesed relation, which comprises a single air tube leading to and independently connected with the intake ports of each siamesed pair, an air header to which all said tubes are connected, throttle valve means in said header, a separate fuel chamber for each cylinder, a conduit independently connecting each fuel chamber with the intake port of its respective cylinder, the fuel chambers of each siamese pair being independently connected to said air tube for equalization of pressure therein, and an intake valve for opening and closing each said intake port.

25. A fuel supply system for an internal combustion engine of the multi-cylinder type having the intake ports of adjacent cylinders arranged in siamesed relation, which comprises a single air tube connected directly to atmosphere and leading to and independently connected to the intake ports of each siamesed pair, a separate throttle valve for each said tube, means for controlling all said throttle valves in unison, a single fuel chamber for both cylinders of each siamese pair, a separate and independently-sized conduit connecting said fuel chamber with the intake port of each cylinder, the fuel chamber of each siamese pair being independently connected to its respective air tube for equalization of pressure therein, and an intake valve for opening and closing each said intake port.

26. A fuel supply system for an internal combustion engine of the multi-cylinder type having the intake ports of adjacent cylinders arranged in siamesed relation, which comprises a single air tube leading to and independently connected with the intake ports of each siamesed pair, an air header to which all said air tubes are connected, throttle control means for said header, a single fuel chamber for both cylinders of each siamese pair, a separate and independently-sized conduit connecting said fuel chamber with the intake port of each cylinder, the fuel chamber of each siamese pair being independently connected to its respective air tube for equalization of pressure therein, and an intake valve for opening and closing each said intake port.

27. In a fuel supply system for internal combustion engines, means providing a passage through which liquid fuel is fed from said chamber directly to one of the engine cylinders, means providing an air passage leading directly to said one cylinder, means controlling admission of air to and pressure thereof in said air passage, common means simultaneously controlling entry of both air and fuel from their respective passages into said cylinder, and means for causing the fuel to be fed in metered quantity from said fuel chamber by and under the control of the pressure in said air passage.

28. In a fuel system for internal combustion engines of the multi-cylinder type, separate, full-capacity means for supplying atmospheric air directly to each cylinder, a fuel chamber, means independent of the air conveying means for supplying liquid fuel from said chamber directly to each cylinder, an intake valve for each cylinder adapted to simultaneously control the entry of fuel and air to the cylinder, a throttle valve associated with said air supplying means, and means constructed and arranged to cause fuel to be fed from said chamber in variable amount according to the variation of the pressure in said air supply means between said throttle valve and the cylinder.

29. In a fuel supply system, the combination of a fuel chamber, an air intake pipe, a throttle valve for said intake pipe, means including a conduit for delivering fuel from said chamber directly into the cylinder, an intake valve associated with both said conduit and said intake pipe for simultaneously controlling the admission of fuel and air from their separate sources into the cylinder, the arrangement being such that initial mixture of the fuel and air takes place at said intake valve, and means rendering the air pressure in said intake pipe effective to control the amount of fuel fed from said chamber through said conduit to said intake valve.

PERCIVAL S. TICE.